United States Patent [19]
Henrickson et al.
[11] 3,852,533
[45] Dec. 3, 1974

[54] SAMPLING AND ANALOG-TO-DIGITAL CONVERTER APPARATUS FOR USE IN A TELEPHONE MESSAGE METERING SYSTEM

[75] Inventors: Gary C. Henrickson, Palo Alto; John C. McDonald, Los Altos, both of Calif.

[73] Assignee: Vidar Corporation, Mountain View, Calif.

[22] Filed: Jan. 5, 1973

[21] Appl. No.: 321,376

[52] U.S. Cl. .......................... 179/8 A, 340/347 AD
[51] Int. Cl. .......................................... H04m 15/38
[58] Field of Search .................... 179/7 R, 8 A, 8 R; 340/347 AD; 307/235 R, 235 A, 237

[56] References Cited

UNITED STATES PATENTS

| | | | |
|---|---|---|---|
| 3,299,421 | 1/1967 | Neitzel | 340/347 AD |
| 3,315,251 | 4/1967 | Kanero | 340/347 AD |
| 3,509,558 | 4/1970 | Canero | 340/347 AD |
| 3,603,972 | 9/1971 | Vanderford | 340/347 AD |

*Primary Examiner*—Kathleen H. Claffy
*Assistant Examiner*—Gerald L. Brigance
*Attorney, Agent, or Firm*—Flehr, Hohbach, Test, Albritton & Herbert

[57] ABSTRACT

Disclosed is a local message metering system which detects the analog voltage of a telephone subscriber metering line caused by the trunk circuit of a telephone exchange. Analog gates are employed for periodically sampling the voltage on the subscriber lines to be monitored. The gates are resistance coupled to the metering line with a high impedance input circuit which insures that the metering system does not disturb the operation of the switching entities. The analog voltage of the metering line is converted through an A-to-D converter to a digital representation which indicates subscriber usage information.

18 Claims, 10 Drawing Figures

SAMPLING AND ANALOG-TO-DIGITAL CONVERTER APPARATUS FOR USE IN A TELEPHONE MESSAGE METERING SYSTEM

CROSS REFERENCE TO RELATED APPLICATION

MESSAGE METERING SYSTEM, invented by JOHN C. McDONALD et al., Ser. No. 295,656 filed Oct. 6, 1972, now U.S. Pat. No. 3,818,456, assigned to Vidar Corporation.

BACKGROUND OF THE INVENTION

The present invention relates to the field of telephone systems and particularly to message metering systems for detecting and storing information concerning subscriber usage and particularly to systems for sensing the analog voltage of a metering line associated with conventional telephone switching circuits.

Message metering equipment is necessary for recording information resulting from long distance, toll, local and other types of telephone service. Such equipment requires the ability to detect and store information to enable usage-sensitive charging of subscribers. Conventionally, local use by subscribers has been on a non-time-sensitive basis employing equipment which has not heretofore been readily adapted to timing. Such circuitry typically includes analog voltage levels which are not compatible with the logic levels of high-speed data processing circuits of modern data processing equipment. Because installed telephone equipment cannot be economically discarded, the installed analog circuits must be reliably adapted to be interfaced with high-speed message metering equipment.

SUMMARY OF THE INVENTION

The present invention is an apparatus for sampling and analyzing the analog levels of a plurality of telephone switching lines. The sampled analog signals are converted to encoded digital signals representing the activities of the associated telephone subscribers.

The circuitry of the present invention includes a current source to cause voltages to be generated from resistances between the subscriber metering circuits and an input attenuator to allow the voltage on the subscriber metering line to be measured. The attenuator is connected to a holding capacitor which serves the dual function of holding the voltage of the metering lines and of establishing the bandwidth of the sampling system. The output from the storage capacitor is sensed by analog switches.

In a preferred embodiment of the invention, one analog sampling switch includes a pair of diodes connected in series in opposite conducting directions. A sampling line is connected through a resistor to a point between the diodes and the sampling line level controls the transmission of the capacitor voltage across the diode pair. A second analog sampling switch for detecting the output from the first switch in accordance with one preferred emdodiment of the invention, is implemented using a field effect transistor (FET).

The output from the sampling switches serves as an input to an analog-to-digital converter which includes a plurality of threshold detectors which sense the level of the sampled input analog signal and responsively establish a digital output. The converter additionally includes logic circuits which detect and encode the value of the analog signal level. In addition the logic circuits check for invalid digital representations.

The transfer function of the attenuator and analog switches of the system limits the voltage swing to a fixed range, for example, ± 4 volts, even for large surges in the input signal. For example, surges of 1,000 volts or more do not cause the analog switch output voltage to exceed the fixed range.

In accordance with the above summary, the present invention achieves the objective of providing a message metering system having analog sampling circuitry and A-to-D conversion circuitry which forms digital representations signifying local subscriber usage of a telephone system.

Additional objects and features of the invention are apparent from the following description in which preferred embodiments of the invention have been set forth in detail in conjunction with the drawings.

DETAILED DESCRIPTION

Figure 1:
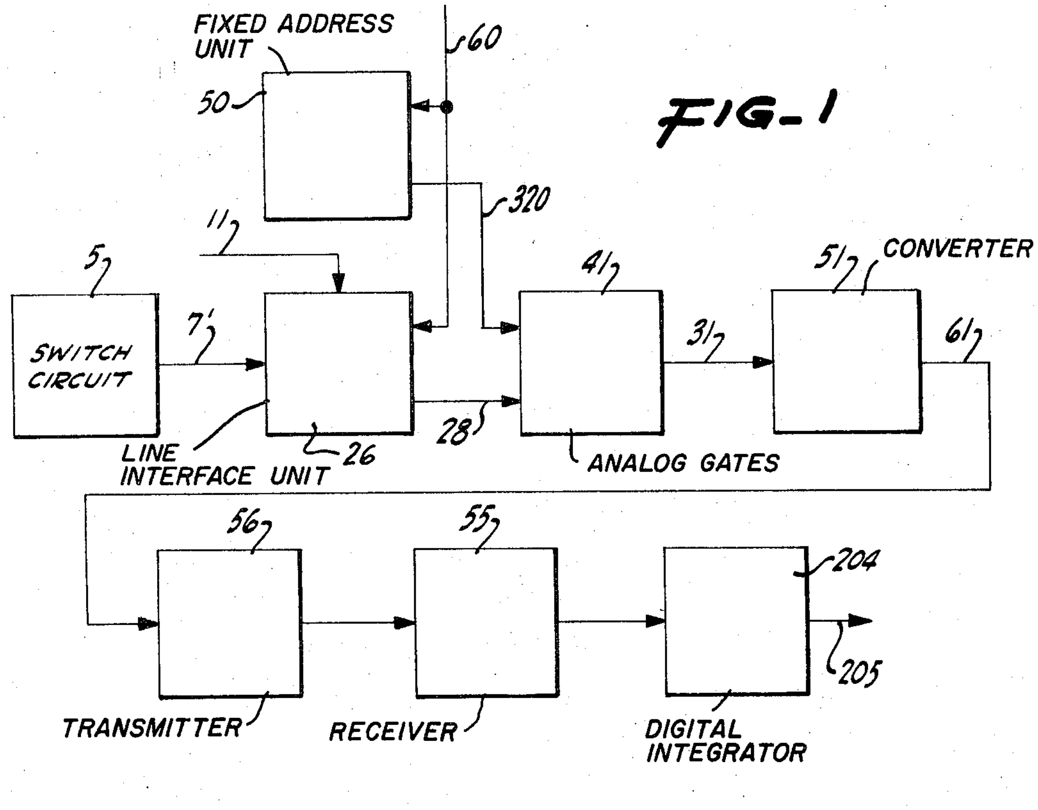
FIG. 1 depicts a schematic representation of the interconnection of the analog and the digital circuitry for one data path associated with one subscriber in accordance with the present invention.

Referring to FIG. 1 a block diagram of one data path for the analog and digital circuitry associated with one local telephone subscriber at a particular time is shown. The switching circuit 5 represents a conventional portion of a cross-bar switch with certain modifications, hereinafter described, which enable the circuitry of the present invention to detect a multi-level signal. The multi-level signal appears on line 7' which is connected as an input to a line interface unit (LIU) 26. Unit 26 includes a current source, an attenuator and an analog sampling gate. The unit 26 has its output on line 28 connected as an input to analog gate 41. Gate 41 also received an input on line 320 from a fixed address unit (FAU) 50. Gate 41 functions to select its input from the fixed address unit 50, from the line interface unit 26 or from other units (not shown). Gate 41 has its output connected on line 31 as an input to the A-to-D converter 51. The A-to-D convertor provides digital signals on output lines 61. Lines 61 serve as an input to the digital transmitter 56. Transmitter 56 transmits the digital representation to the digital receiver 55 which, in turn, has its output connected as an output to the digital integrator 204.

The digital integrator 204 functions to receive a digital representation of the level of the analog signal on line 7' and forms an indication of that level on line 205. Further details of the overall message metering system which employs the circuitry of FIG. 1 are depicted in the above-referenced application MESSAGE METERING SYSTEM. The specific details of that application are hereby incorporated by reference in this specification for the purpose of teaching the overall operation of a telephone metering system.

NO. 1 CROSSBAR SWITCH

Figure 2:
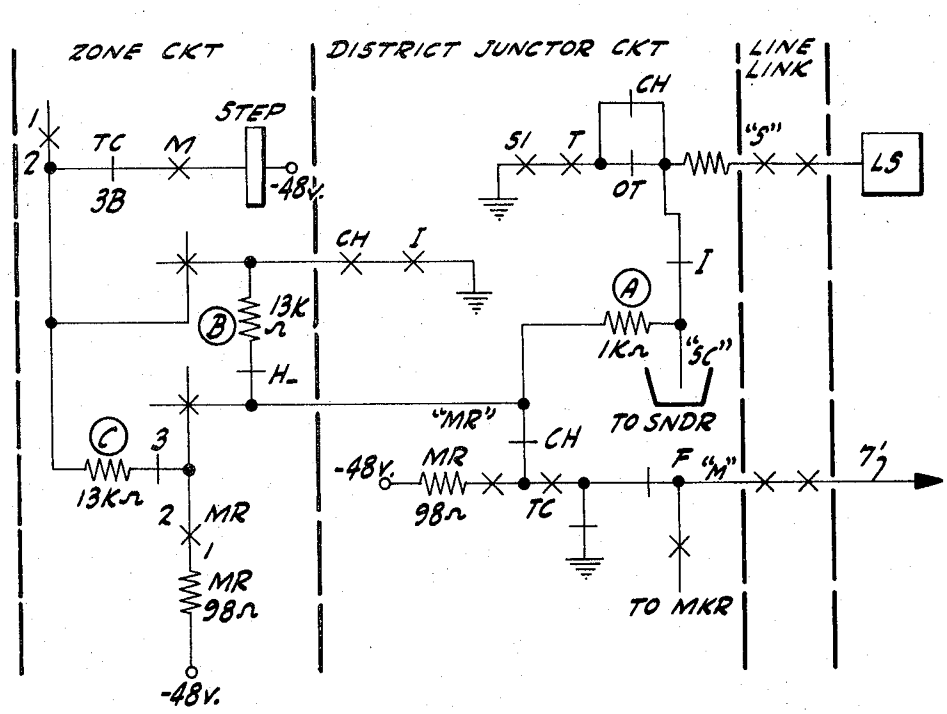
FIG. 2 depicts a schematic representation of a typical telephone circuit from which the subscriber metering lines are derived.

In FIG. 2, a portion of a standard No. 1 Crossbar Switch is shown. That standard switch is modified by the addition of two resistors (A and B) for each district junctor circuit. Resistor A couples the sleeve lead to the M lead 7' through contacts of the F, CH, TC and I relays. The connection points for resistor A touch only leads terminating in other circuits so that wiring is done easily. Resistor B is also conveniently connected at the zone connector crossbar switch. Resistor C is wired internally within each zone circuit. The M lead output line 7' is at one of four levels, –48, GND, +9 or +25 volts.

SCANNER BANK

Figure 3:
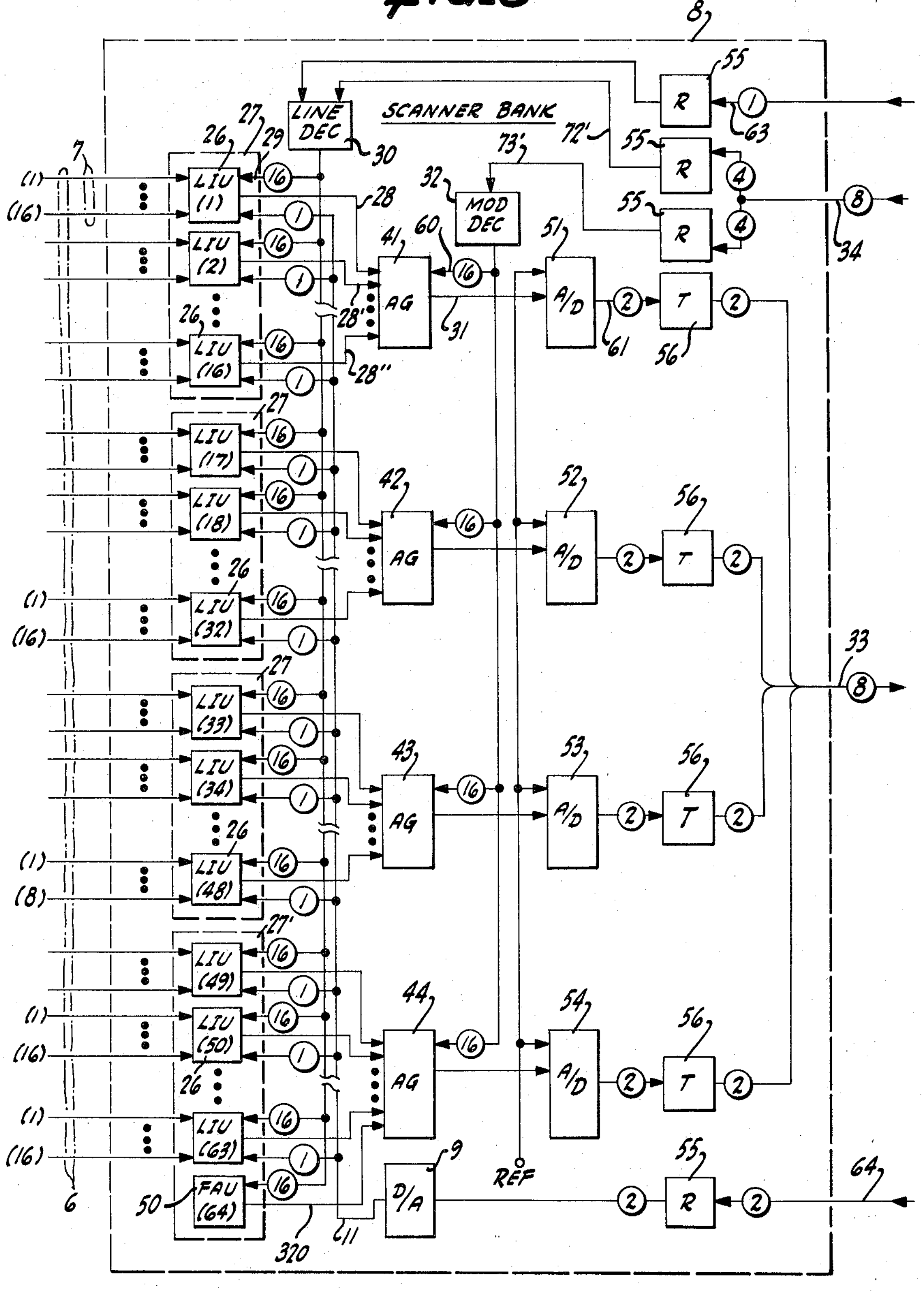
FIG. 3 depicts a schematic representation of a scanner bank portion of a message metering system which utilizes the FIG. 1 circuitry.

Referring to FIG. 3, a typical one of the scanner banks 8 of the above cross-referenced application is shown in detail. The 1,000 lines 6, derived from the switching circuit 5, are input to a plurality of line interface units (LIU) 26, with 16 inputs per unit. The 16 input lines 7 to the LIU (1) are typical. Each LIU functions under control of input address lines 29, to select one of the 16 input lines and connect it to output line 28 as shown, for example, in connection with LIU (1). The particular one of the 16 input lines is gated to the one output line by appropriate selection of one of the 16 select lines 29. The 16 select lines are derived from a line decoder 30 which receives and decodes a 4-bit binary input on lines 72' via receiver 55 and bus 34 to select one of its 16 outputs. Each of the 16 output select lines from the line decoder 30 is connected as an input to all the LIU units (1) through (63) and the fixed-address-unit (FAU) 50. Groups of 16 LIU's 26 form a module 27 with 16 output lines connected as inputs to analog gates. Specifically, LIU (1), LIU (2),..., LIU (16) have their output lines 28, 28',...,28'' connected as the 16 inputs to the analog gates 41. Similarly, the LIU (17) through LIU (32) have their respective outputs connected as the 16 inputs to the analog gates 42. Finally the LIU (49) through LIU (63) have their outputs connected as the 16 inputs to the analog gates 44. The analog gates 41 through 44 are each operative to select one of their respective 16 inputs to form a single output to an analog-to-digital (A/D) converter. Specifically, analog gates 41, 42, 43 and 44 each have an output 31 which is connected as an input to the analog-to-digital converters 51, 52, 53 and 54, respectively. The selection of which one of the 16 inputs to analog gates 41 is connected as the output on line 31 is controlled by one of the 16 select lines 60 input in common to each of the gates 41 through 44. The select lines 60 are derived from the module decoder 32 which receives a 4-bit binary input on lines 73' via receiver 55 and bus 34 and decodes it to energize one of its 16 outputs.

The operation of the decoders 30 and 32, in connection with the LIU's (1) through (16) and the analog gates 41 is to select one of 256 subscriber line input signals at any one time and connect that subscriber signal as an input to the analog-to-digital converter 51. The converter 51 senses the multivalue input on line 31 and encodes it into a 2-bit binary code on output lines 61. Lines 61 are connected as an input to the transmitters 56. Transmitters 56, one for each of the two lines 61, serve as a high impedance isolation, when connected through a corresponding receiver, between the scanner bank of FIG. 2 and the scanner bank adapter. Simultaneously, the decoders 30 and 32 also select one of 256 of the subscriber signals from LIU's (17) through (32) for encoding to a 2-bit signal output from converter 52, one of 256 of the subscriber signals from LIU's (33) through (48) which produces the encoded output from converter 53, one of 232 of the subscriber signals from LIU's (49) through (63) or one of the 16 fixed values from FAU (64) to produce the encoded output from converter 54. The 2-bit outputs from each of the converters 51 through 54 are each, through transmitters 56, formed as the eight output lines of bus 33.

The LIU (63) includes only eight used inputs so that together with the 992 inputs of the LIU (1) through LIU (62) there are a total of 1,000 subscriber inputs 6.

The fixed address unit (FAU) 50 receives the 16 address bits on address bus 29 from the line decoder 30. The unit 50 has its 16 address locations wired to selected marginal values which test the REF input to each of the analog-to-digital converter 51 through 54. Additionally, the unit 50 when addressed, tests the threshold values within the converter 54. While the unit 50 has been shown with inputs only to converter 54 via gates 44, the fixed addresses can be distributed through the LIU (1) through (63) so that fixed addresses are connected to each of the converters 51 through 54 thereby testing each of those converters.

All of the LIU (1) through (63) have an analog input from line 11 derived from input 64 which is output from the scanner bank adapter. The input bits on line 64 function to define three values (high, normal and low) to test all of the units (1) through (63). Those three analog values are produced in the digital-to-analog (D/A) converter 9 on output line 11. Additionally, the line decoder 30 has an input via line 63 from the scanner bank adapter. That input line 63 functions to de-energize all units (1) through (64) so that none are selected.

LINE INTERFACE UNIT

Figure 4:
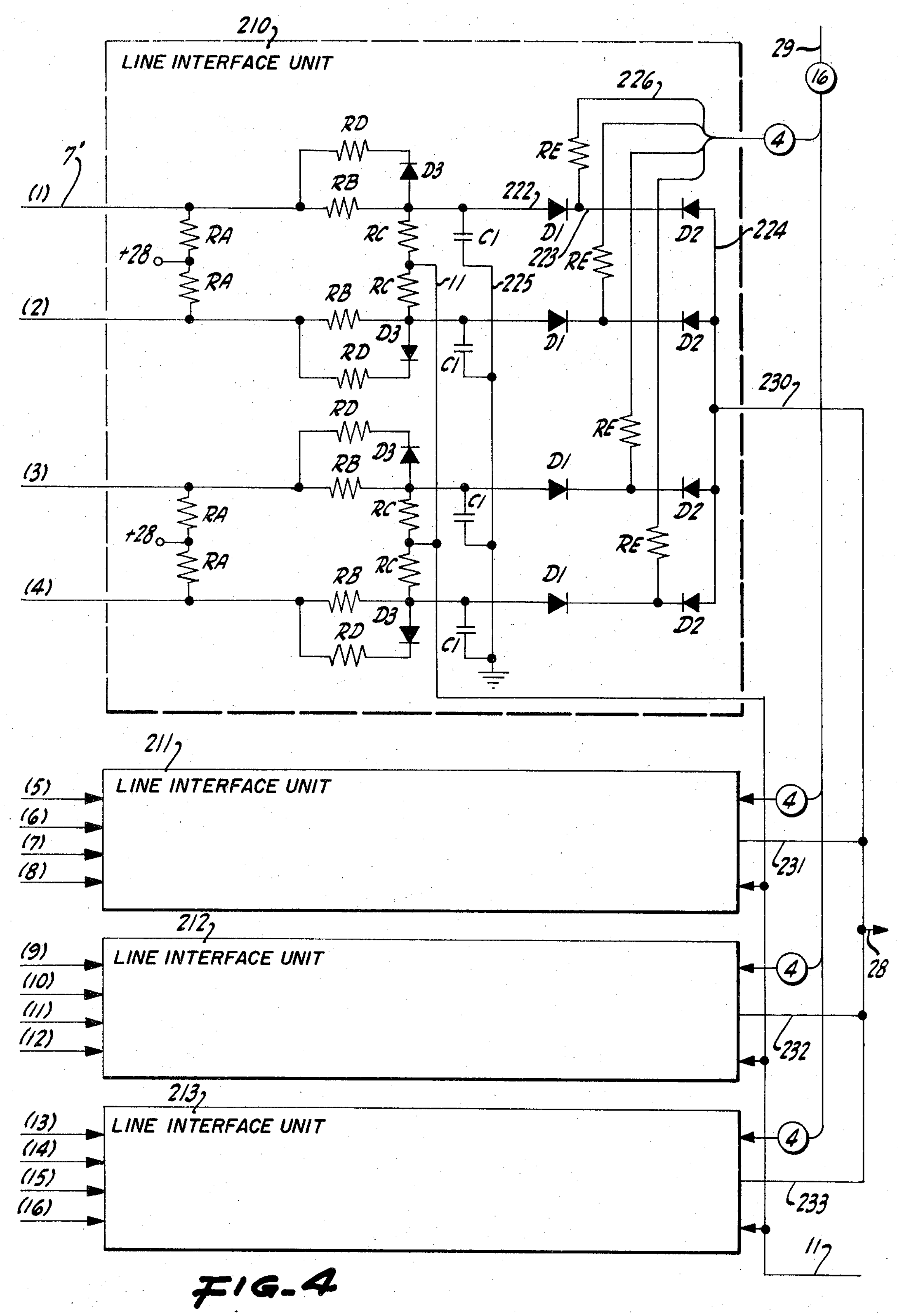
FIG. 4 depicts a schematic representation of one line interface unit (LIU) utilized within the FIG. 3 circuitry.

Referring to FIG. 4, further details of the line interface unit 26 of FIG. 3 are shown. The unit 26 includes inputs 1, 2, ...,16 and a single output on lines 28. Those inputs are divided into groups of four. The first group of four inputs (1,2,3,4 circuit 210) connect to the current sources comprising RA and the +28 volt source, attenuator and analog sampling gate circuitry. The line interface unit 26 also includes three other current sources, attenuators and analog sampling gate circuits 211, 212 and 213 which are identical to the circuit 210 and which receive the remaining three groups of inputs, respectively.

Within the circuitry 210, the four input lines 1, 2, 3 and 4 each connect to substantially identical circuits. For purposes of this specification, the input (1) is line 7'. Line 7' connects through a 330 K ohm resistor RB to a 0.1 microfarad capacitor C1. Capacitor C1 connects through line 222 to diode D1. Line 7' also connects through a 27 K ohm resistor RA to a +28 volt supply. The resistor RB is connected in parallel with a 13 K ohm resistor RD in series with a diode D3. The diode D3 and resistor RD function to optionally shift the voltage range on the input line 7'. For low negative voltage level operations, the resistor RD and diode D3 are retained in the circuit. When it is desired to increase the input negative voltage range of input line 7', they are removed.

Line 222 connecting to one end of capacitor C1 also connects through a resistor RC to a test line 11. Test line 11 similarly connects to all the other attenuators circuits in the line interface unit and is used to simultaneously enable all circuits within FIG. 4 for testing.

Capacitor C1, connected on one side to line 222, connects on the other side via line 225 to ground. Capacitor C1 functions to store the voltage level of input line 7' and thereby functions as an auxiliary current source for the analog sampling gate comprised of diodes D1 and D2.

Diode D1 is connected in series with diode D2 by line 223 and diodes D1 and D2 are arranged in opposite conduction directions. Line 223 is also connected to the sample line 226 through 100 K ohm resistor RE. Line 226 is one of the 16 decode lines 29 which are derived as an output from the line decoder 30 of FIG. 3. When line 226 is not selected, it is at a positive voltage level in the order of +10 volts and when it is selected it is at a negative voltage level in the order of −20 volts. When line 226 is positive, both diodes D1 and D2 are cut-off and hence the voltage across capacitor C1 is not propagated to output line 224 which is connected to diode D2. When 226 is in the negative state, both diodes D1 and D2 are biased in the conduction state so that any voltage across C1 is propagated through to lilne 224. Line 224 is connected in common with the similar outputs from the other circuits in circuitry 210 and together they form the common output on line 230. The output on line 230 is connected along with the outputs on line 231, 232 and 233 from the other circuits 211, 212 and 213 to form a single output on line 28. Only one of the 16 lines 29 is selected at any given time so that only one of the D1 and D2 diode pairs in any one of the circuits 210 through 213 is sampled at any given time. All other outputs are in the non-selected state.

Figure 9:
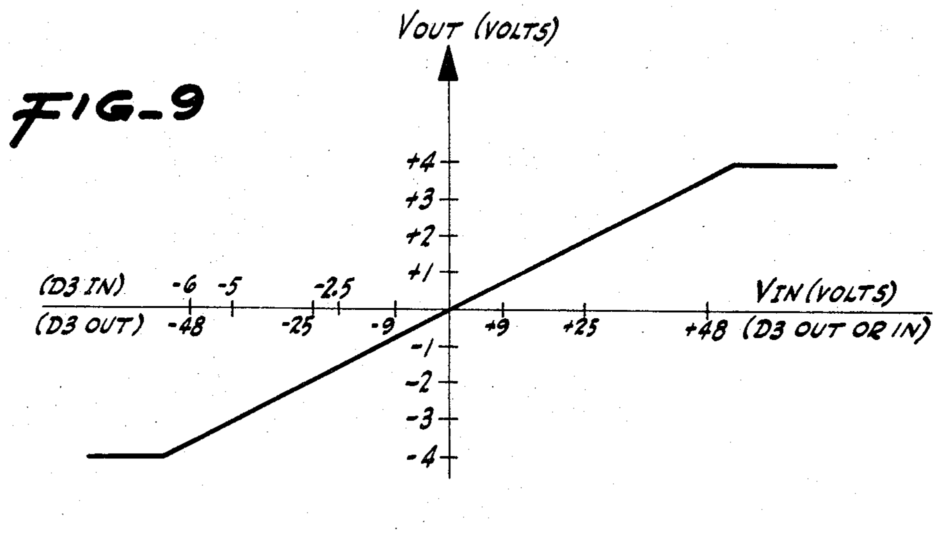
FIG. 9 depicts a voltage transformation graph of voltages in the FIG. 4 circuitry.

Further details of the attenuator and sampling gate circuitry of FIG. 4 can be understood with reference to the voltage transformation graph shown in FIG. 9. FIG. 9 represents the voltage in, for example, on line 7' versus the voltage output on line 28. There are two conditions of operation, namely, with the D3/RD leg removed (D3 OUT) or with the D3/RD leg as shown (D3 IN). As will be described hereinafter in connection with FIG. 10, the D3 IN case nominally receives an input voltage on line 7' which ranges from +25 to −48 volts.

Under certain conditions, the circuit of FIG. 2 generates no voltage signal by itself on line 7' but appears as a resistive network. Under this condition, the +28 volt source in circuitry 210 through resistor RA acts as a current source into the FIG. 2 circuitry via line 7' thereby generating a voltage on line 7'. The voltage on line 7', whether internally generated in the circuitry of FIG. 2 or as a result of the current generated in the circuitry 210, produces a voltage which connects through the resistor RB and the resistor RC act as a voltage dividing network which impresses a voltage across the capacitor C1 thereby charging capacitor C1 to an appropriate level.

If the voltage on line 7' is positive, the diode D3 is reversed biased and has essentially an infinite impedance. Under those conditions, the voltage established across C1 is essentially a ratio of RC to the sum of RC and RB in a voltage divider network. When a negative voltage appears on line 7', diode D3 is forward biased so that the resistor RD is essentially in parallel with the resistor RB. The voltage in that case of a negative signal on line 7' is the ratio of RC and the sum of RC and the parallel combination of RB and RD.

The voltage established across capacitor C1 is employed to insure that, when the diode D1 is in the conduction state as partially controlled by the select line 226 and resistor RE, the current through resistor RC does not change as a result thereof. A change in current, of course, would result in a change in the voltage which is propagated from line 222 to the line 224. Capacitor C1, therefore, acts as an auxiliary current source whenever diode D1 is conducting to insure that D1 propagates the correct level.

Note that the operation of diode D3 and resistor RD is to control the negative voltage transformation without affecting the positive voltage transformation. By removing the diode D3 and the resistor RD, both the positive and negative voltage transformations are the same.

Referring again to FIG. 9, under the D3 IN condition, the output voltage is between zero and −4 volts when the input is between zero and −6 volts. For the D3 out condition, the output voltage is also between zero and −4 volts for an input voltage between zero and −48 volts. In either condition, the output voltage for positive values in between zero and +4 volts for inputs between zero and +48 volts.

The ±4 volt cut-off, as evident from the graph of FIG. 9, results because of the actions of diodes D1 and D2. Whenever input line 222 attempts to go more negative than −4 volts, as occurs for example with an input negative noise spike, line 223 cannot follow because of the current division caused by resistor RE and resistor RF and RG. At the −4 point, line 223 becomes more positive than line 222 and therefore reverse biases diode D1. In a similar manner, whenever a positive spike on line 222 tends to exceed +4 volts, diode D1 is forward biased causing line 223 to go more positive than +4 volts. Line 224, which is connected between the resistors RG and RF of FIG. 5, cannot exceed plus 4 volts and hence diode D2 becomes reversed biased at the +4 volt level. The operation of diodes D1 and D2 constrains the voltage transfer between ±4 volts which, as indicated in FIG. 9, is linear over that range as a function of the input voltage.

ANALOG GATE

Figure 5:
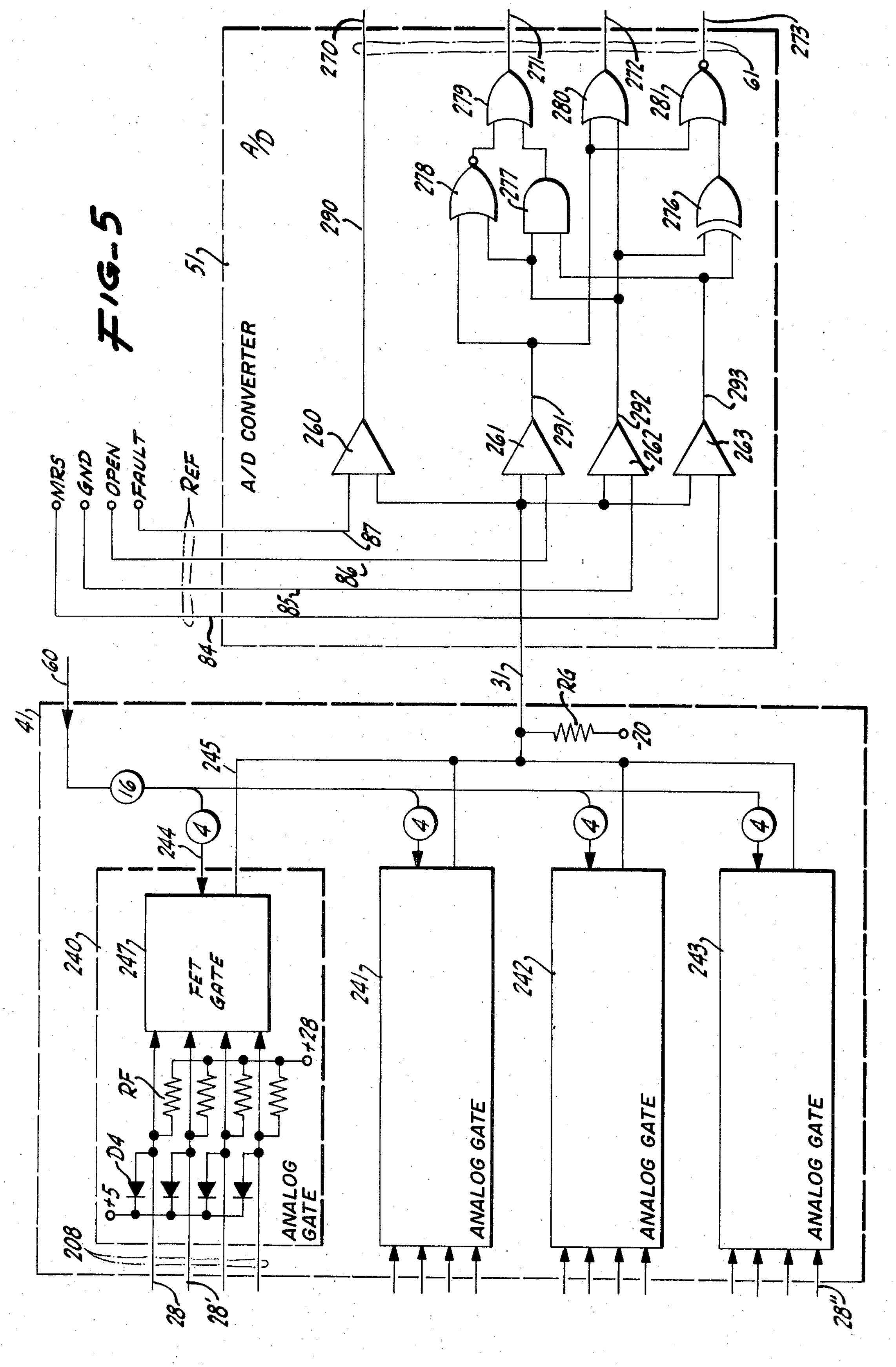
FIG. 5 depicts a schematic representation of the analog gates and the A-to-D converter utilized within the circuitry of FIG. 3.

Referring to FIG. 5, the analog gate 41 corresponds to the like-numbered gate in FIG. 3. Gate 41 receives 16 inputs, one corresponding to each of the first 16 line interface units in a module 27 of FIG. 3. The circuitry 240 associated with the first four line interface units 26 of FIG. 3 is shown in detail in FIG. 5. The three other analog gate circuits, 241, 242 and 243 are identical to circuit 240.

Referring to the circuit 240, the input line 28 from the LIU of FIG. 4 is connected as an input to a four-input field effect transistor (FET) gate 247. In a similar manner, three other line interface units also have inputs to the gate 247. Each input is protected against voltage extremes by a respective diode D4 which is connected, for example in the case of line 28, from line 28 to a +5 volt source. Line 28, like each of the other input lines 208, is also connected by a 100 K ohm resistor RF to a plus 28 volt source. Gate 247 functions, in response to a selected one of the four select lines 244, to connect one of four input lines 208 to the single output line 245. Gate 247 is a standard gate and is typically like that sold by Siliconix under the number DG172BK. Output line 245 from gate 247 is connected in common with the output lines from each of the other circuits 241 through 243 to form the single output line 31 which connects as an input to the analog-to-digital converter 51. Line 31 is also connected through a 100 K ohms resistor RG to a −20 volt source.

The four select lines 244 are four of the 16 select lines 60 which are output from the module decoder 32 of FIG. 3.

The resistor RF and the resistor RG through the gate 247 cooperate with the sampling gate comprised of diodes D1 and D2 of FIG. 4 in a special manner. In FIG. 4, it is desirable that the capacitor C1 not be discharged whenever the select line 226 is energized unless the corresponding gate for line 28 of the four gates 247 is also closed. If capacitor C1 were discharged each time line 226 is selected, the capacitor would not store a charge which maintains an accurate measurement. In order to insure that capacitor C1 does not discharge except when the line 226 and the associated one of the FET gates 247 are simultaneously selected, the resistor RG and the resistor RF form a divider network which biases the diode D1 off except when the associate one of the gate 247 is closed. With the gates 247 in the open condition, the resistor RG, connected to a −20 volt source, is effectively out of the circuit so that the current path is through the +28 volt source, resistor RF, diode D2, resistor RE and the −20 volt level of select line 226. Under these conditions, line 223 is approximately at +4 volts which thereby effectively reverse biases diode D1 preventing any discharge of capacitor C1. It should be noted that because of the attenuator circuit, the maximum voltage across capacitor C1 is approximately +4 volts.

Whenever line 28 in FIG. 5 is connected to 245, resistor RG and the −20 volt source are in parellel with the resistor RF and the +28 volt source. The equivalent circuit of this parellel circuit is a 50K resistor tied to a +4 volt source. The circuit path through the effective 50K resistor is through line 230, line 224 and diode D2 to line 223 where it is further connected to resistor RE and the select line 226. Under these conditions, with select line 226 energized to −20 volts and the associated one of gates 247 is closed, the diode D1 is able to conduct as a function of the signal on line 222 allowing the voltage on capacitor C1 to be sampled. The current through resistor RC remains essentially constant and the current from capacitor C1 conducts through diode D1 and resistor RE. Any change in current caused by current in line 222 through resistor RE causes a compensating change in the current through diode D2 as supplied through line 224. The corresponding change in current through diode D2 follows the change in current through diode D1 thereby transferring the voltage from line 222 to the line 224 in turn to the line 230 and onward through the associated one of the gates 247, line 245, line 31 forming and input to the analog-to-digital converter 51.

As previously described in connection with the above-identified cross-referenced application, each select line, like select line 226 is energized 16 times out of a cycle of 256 times. Similarily, each select line, like the select lines 244 to gate 247, is energized 16 times out of a total of 256. However, the coincidence of a select line in gate 247 and an associated select line in the sample gates of FIG. 4 occurs only once per 256 samples. As previously discussed, a coincident energization of the select line 226 and the associated select line 244 is required before diode D1 is biased to conduct. Accordingly, the storage capacitor C1 is only sampled once per cycle of 256 samples, that is, C1 conducts specifically and only at the time when it is desired to transfer voltage from line 222 to line 224.

ANALOG-TO-DIGITAL CONVERTER

Figure 6:
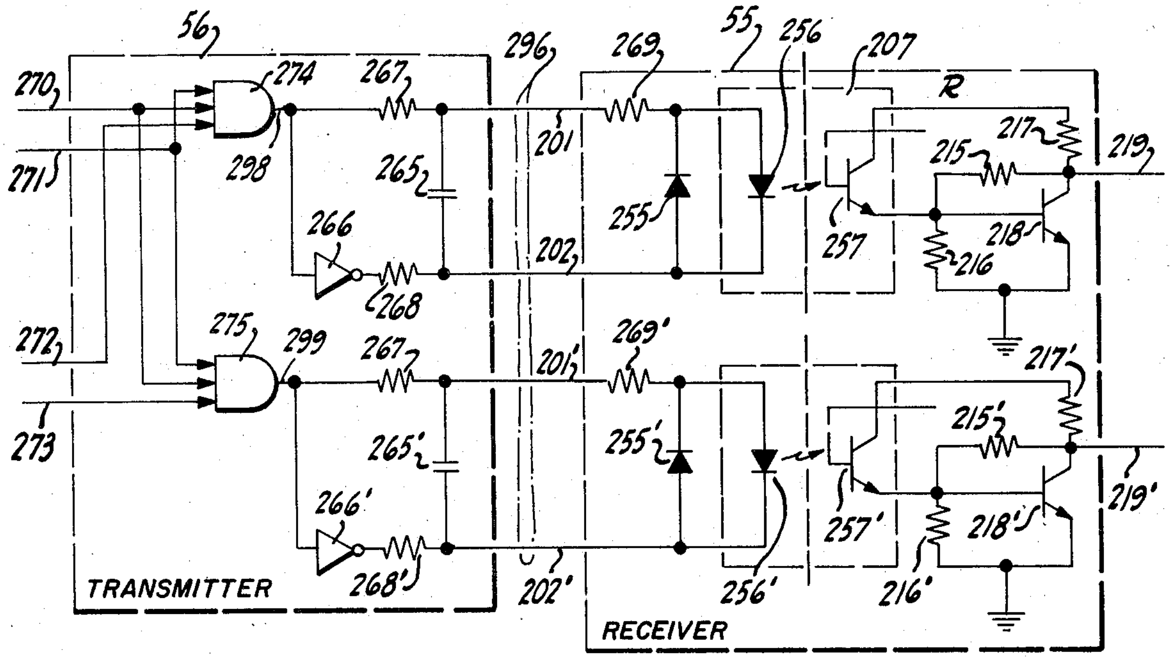
FIG. 6 depicts a schematic representation of the transmitter and receiver which transmits the output from the A-to-D converter of FIG. 5.

Referring to FIG. 5, the analog-to-digital converter 51 receives the analog input signal on line 31 and produces a digital representation thereof on in FIG. 6. Converter 51 includes four comparators 260 through 263 each of which is connected to a separate reference level established by the reference lines 84 through 87 for comparison with the analog signal 31. Specifically, the level on line 87 is established for detecting fault conditions. The level on line 86 is established for detecting open M lead conditions. The level on line 85 is established for detecting resistive ground conditions. The level on line 84 is established for detecting message register soore (MRS) conditions.

The output from comparator 261 is connected as an input to NOR gate 278, OR gate 280 and a NOR gate 81. Output line 292 from comparator 262 is connected as an input to NOR gate 278, AND gate 277, EXCLUSIVE-OR gate 276 and OR gate 280. Finally, output line 293 from 263 is connected as an input to AND gate 277 and EXCLUSIVE-OR gate 276. EXCLUSIVE-OR gate 276 in turn has its output connected as an input to NOR gate 81 which forms as its output line 273. Similarly, OR gate 280, with the indicated inputs, forms the output line 272. In a similar manner, OR gate 279, receiving inputs from NOR gate 278 and AND gate 277, forms as its output the line 271.

The four output lines 270 through 273 define the various states of the input line 31. For purposes of understanding, the two AND gates 274 and 275 of FIG. 6 may be considered as logically part of the A-to-D converter. The state of output lines 298 and 299 from gates 274 and 275, respectively, succinctly define the output of converter 51 as shown in the following Table I.

TABLE I

| Line 290 | Line 291 | Line 292 | Line 293 | Line 298 | Line 299 | Condition of Line 7' |
|---|---|---|---|---|---|---|
| 0 | 0 | 0 | 0 | 0 | 0 | GND |

TABLE I-Continued

| Line 290 | Line 291 | Line 292 | Line 293 | Line 298 | Line 299 | Condition of Line 7' |
|---|---|---|---|---|---|---|
| | | | | | | (0 volts) |
| 0 | 0 | 0 | 1 | 0 | 0 | GND |
| 0 | 0 | 1 | 0 | 0 | 0 | GND |
| 0 | 0 | 1 | 1 | 0 | 0 | GND |
| 0 | 1 | 0 | 0 | 0 | 0 | GND |
| 0 | 1 | 0 | 1 | 0 | 0 | GND |
| 0 | 1 | 1 | 0 | 0 | 0 | GND |
| 0 | 1 | 1 | 1 | 0 | 0 | GND |
| 1 | 0 | 0 | 0 | 0 | 1 | MRS |
| | | | | | | (−48 volts) |
| 1 | 0 | 0 | 1 | 0 | 0 | GND |
| 1 | 0 | 1 | 0 | 0 | 0 | GND |
| 1 | 0 | 1 | 1 | 1 | 1 | R GND |
| | | | | | | (+9 volts) |
| 1 | 1 | 0 | 0 | 0 | 0 | GND |
| 1 | 1 | 0 | 1 | 0 | 0 | GND |
| 1 | 1 | 1 | 0 | 0 | 0 | GND |
| 1 | 1 | 1 | 1 | 1 | 0 | OPEN |
| | | | | | | (+25 volts) |

Referring to FIG. 6, the transmitter 56 and receiver combination is shown in further detail. Transmitter 56 receives the digital output from the analog to digital converter 51 on lines 270 through 273. The function of the transmitter 56 is to drive the digital representation of the subscriber usage information over a path comprising lines 296 which may be relatively long and remote from receiver 55. Transmitter 56 includes AND gates 274 and 275. Gate 274 receives inputs on lines 270, 271 and 272 while gate 275 receives inputs on lines 270, 271 and 273.

The output from AND gate 274 on line 298 and from AND gate 275 on line 299 connects through resistor 267 to an input resistor 269 in the receiver circuit 55. Similarly, a complementary signal is developed through the inverter 266 which, through a resistor 268, forms the complementary input to the receiver 55. The output from gate 275 connects in the same manner as the output from gate 274 where the elements are designated by primes. The pairs of output lines 296 from the transmitter 56 are interconnected by a capacitor 265 and 265'.

The lines 296 represent two bi-level signals which represent four unique states of the input multi-level analog signal on the line 7' of FIG. 1. While 12 other states of lines 290, 291, 292 and 293 are mathematically possible under fault conditions, the logic circuitry of converter 51 in combination with the gates 274 and 275 of transmitter 56 limit the possible correct states to a total of four. Those four states are described in connection with Table I above.

Still referring to FIG. 6, the receiver 55 receives as inputs the signals on lines 296. Each pair of lines 201 and 202 and 201' and 202' are identical and accordingly the description hereinafter applies to both the primed and unprimed components of FIG. 6. The input line 201 is connected through a resistor 269 to two anti-parallel diodes 255 and 256. Diode 256 is a light emitting diode which is located in radiant relationship to a light-sensitive transistor 257. Diode 256 and transistor 257 are enclosed within a radiant shield 207 which functions to prevent external radiation from affecting the operation of transistor 257.

Because of the isolation provided by the radiant energy link, the input impedance seen from lines 201 and 202 to receiver ground is very high providing isolation between the transmitter and receiver circuitry. Specifically, a problem of ground signal variations is existant in telephone offices, particularly where long distances separate the circuits as is possible with FIG. 6 transmitters and receivers. If the signal levels are referenced with respect to ground of one potential in transmitter 56 and another potential in receiver, 55 that difference in potential works to responsively cause an unwanted common mode signal from transmitter to receiver. Because of the essentially infinite impedance of the diode 256/transistor 257 pair, however, that unwanted common mode signal causes essentially zero current to flow in the signal path.

The signal received by transistor 257 from diode 256 causes current through transistor 257 which is in turn detected by the amplifier circuit comprising the transistor 218, and resistors 215, 216 and 217. That amplifier functions to keep transistor 257 operating away from saturation and to keep the collector-emitter voltage essentially constant over the operating range. With a constant collector-emitter voltage, the capacitance is not discharged and therefore the switching speed is not adversely affected.

Briefly, transistor 218 with its base input connected to the emitter output of light-sensitive transistor 257 varies its conduction state as a function of the current through light-emitting diodes 256. An increase in conduction of transistor 218 causes the collector-to-emitter voltage to correspondingly alter in an essentially on-off fashion. Whenever transistor 218 is turned on, transistor 218 is essentially a short-circuit to ground causing line 219 to be at essentially ground potential. Whenever transistor 218 is near cut-off, line 219 is essentially at +3 volts determined by feedback resistor 215 and resistors 216 and 217.

In summary, the output signals on lines 219 and 219' are each binary in nature and follow the inverse of the signals on lines 298 and 299. Because of the radiant energy isolation provided between diodes 256 and transistor 257, the transmitter and receiver provide a high degree of isolation which is relatively immune to noise signals.

DIGITIAL INTEGRATER

Figure 7:
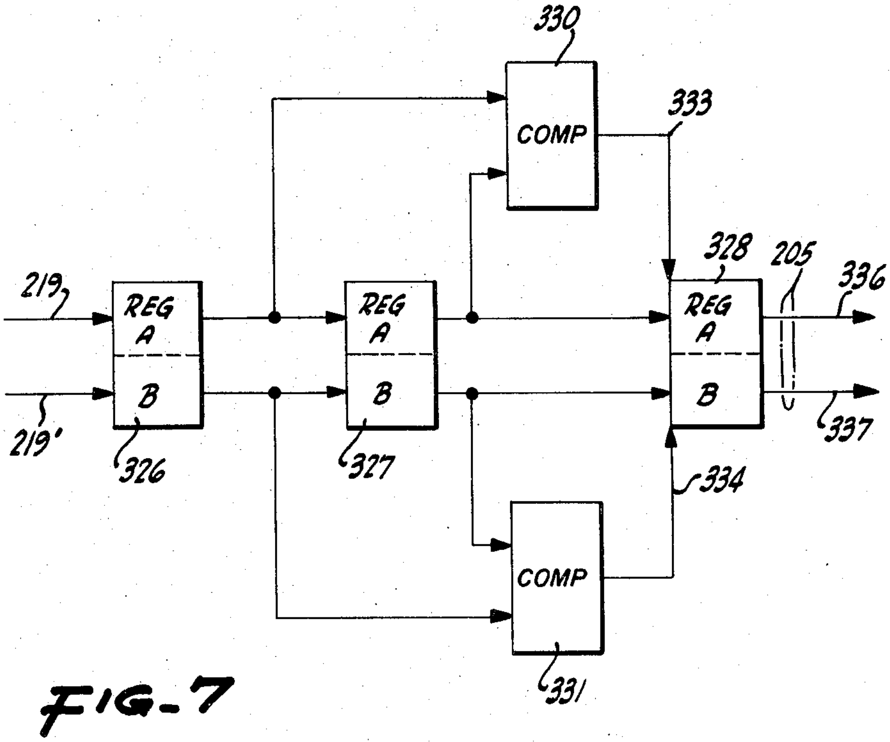
FIG. 7 depicts a schematic representation of the fixed address unit (FAU) utilized within the circuitry of FIG. 3.

In FIG. 7, the digital integrator 204 of FIG. 1 is shown in further detail. The integrator receives the output from the receiver 55 of FIG. 6 on lines 219 and 219' and typically stores them in a two-bit register 326. Each time new data appears on lines 219 and 219', the data is stored in register 326 and the prior contents of Register 326 is stored in register 327. Accordingly, register 326 and 327 store a digitial sample of the present indication as well as the prior indication of, respectively, the analog signal level on line 7' of FIG. 1. Comparator 330 compares the A bit in register 327 with the A bit in register 326. Similarly, comparator 331 compares the B bits in registers 326 and 327. Whenever the A bits or the B bits in register 326 and 327 compare, the respective comparators 330 and 331 form an output on lines 333 and 334, respectively. The output lines 333 and 334 control the gating of the bits in register 327 into a register 328. Neither bit A or B, either bit A or B, or both bits A and B in register 327 may be gated into the register 328 as a function of the comparison carried out in comparators 330 and 331. If no comparison occurs, then the contents of register 328 are not altered. The output from register 328 appears on lines 336 and 337 for the two bits stored and these lines are collectively represented as the lines 205 as shown in FIG. 1.

In addition to the gating controls shown by lines 333 and 334, all of the register in FIG. 7 are additionally times in a conventional manner for latching information in and transferring information from register to register. In general, the timing of the FIG. 7 circuitry is synchronously derived from the timing of the addressing and sampling circuitry in FIG. 3. More specifically, each time an address bit changes in the line decoder 30 and the module decoder 32 of FIG. 3, new information is latched into register 326 and 327. The transfer into register 328 is, of course, controlled by comparators 330 and 331 in the manner previously described.

The operation of the digital integrator of FIG. 7 is further explained in connection with the following CHART I. In CHART I register 328 is assumed to be initially cleared to the zero-zero state for bits A and B. Thereafter, it is assumed that the input data on line 219 and 219', which is latched into register 326, changes in the manner indicated. It is also assumed for purposes of explanation that the registers 326 and 327 are initially in the zero-zero state for bits A and B.

CHART I

| Present | | Past | | Integrated | |
|---|---|---|---|---|---|
| Reg A | 326 B | Reg A | 327 B | Reg A | 328 B |
| 0 | 0 | 0 | 0 | 0 | 0 |
| 0 | 1 | 0 | 0 | 0 | 0 |
| 0 | 1 | 0 | 1 | 0 | 1 |
| 1 | 1 | 0 | 1 | 0 | 1 |
| 1 | 1 | 1 | 1 | 1 | 1 |
| 1 | 0 | 1 | 1 | 1 | 1 |
| 1 | 0 | 1 | 0 | 1 | 0 |
| 0 | 1 | 1 | 0 | 1 | 0 |
| 0 | 0 | 0 | 1 | 0 | 0 |
| 1 | 1 | 0 | 0 | 0 | 0 |

FIXED ADDRESS UNIT

Figure 8:
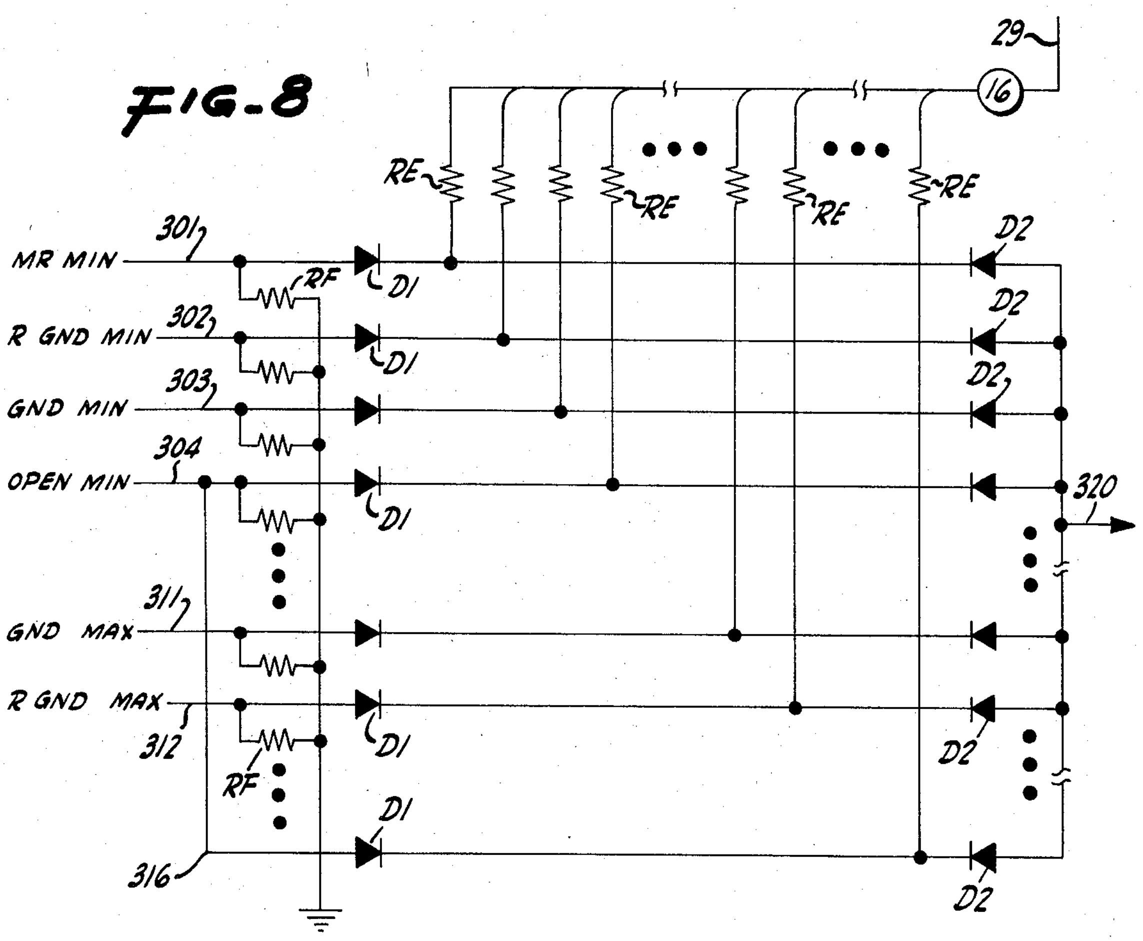
FIG. 8 depicts details of the fixed address unit in the FIG. 3 apparatus.

In FIG. 8, the fixed address unit 50 of FIG. 3 is shown in further detail. The unit 50 provides an output on line 320 which connects as an input to the analog gate 44 in FIG. 3. The unit 50 in FIG. 3 also receives an input bus 29 containing the 16 decoded select lines from the line decoder 30. The address lines 29 each connect through a resistor RE of 100 K ohms which in turn connect to the point between the series connected diodes D1 and D2. Whenever the line is positive, of the order of +10 volts, the diodes D1 and D2 are biased in the cutoff state. Whenever the appropriate select line goes to a −20 volts, the connected one of the diodes pairs is biased in the conduction state. The operation of the diode switches of FIG. 7 is fully analogous to the operation of the similarly designated diode switches in FIG. 4.

The inputs of the diodes D1 for the 16 input lines 301, 302, ..., 316 are derived from six accurate voltage sources. Specifically, input 301 is for measuring the MR MIN condition and for establishing a voltage on line 320 of −1.55 volts, when the appropriate select line is selected to render diodes D1 and D2 in the conduction state. Similarly, inputs 302, 303, 304, 311 and 312 establish the test for R GND MIN, GND MIN, OPEN MIN, GND MAX, and R GND MAX, respectively. The voltage levels produced on line 320 by the input voltages on those indicated lines are +0.30, −1.35, +0.96, +0.10 and +0.76, respectively.

While the inputs 301 through 304 and 311 and 312 are shown, the fixed address unit of FIG. 8 includes 16 inputs. For example, as shown in FIG. 8, input 316 is connected in common with input 304. In a similar manner the inputs 305 through 310 and 313 through 315 (not explicitly shown in FIG. 7) are each connected in common with an appropriate one of the six input test levels in the same manner that input 316 is connected to input 304. The connection pattern of the inputs is significant in the operation of the fixed address unit testing sequence.

The actual common connections of the inputs for one preferred embodiment has connected in common with 308, 312 and 313; 302 connected in common with 307; 303 connected in common with 306; 304 connected in common with 305, 309 and 316; 310 connected in common with 315; 311 connected in common with 314.

OPERATION

Figure 10:
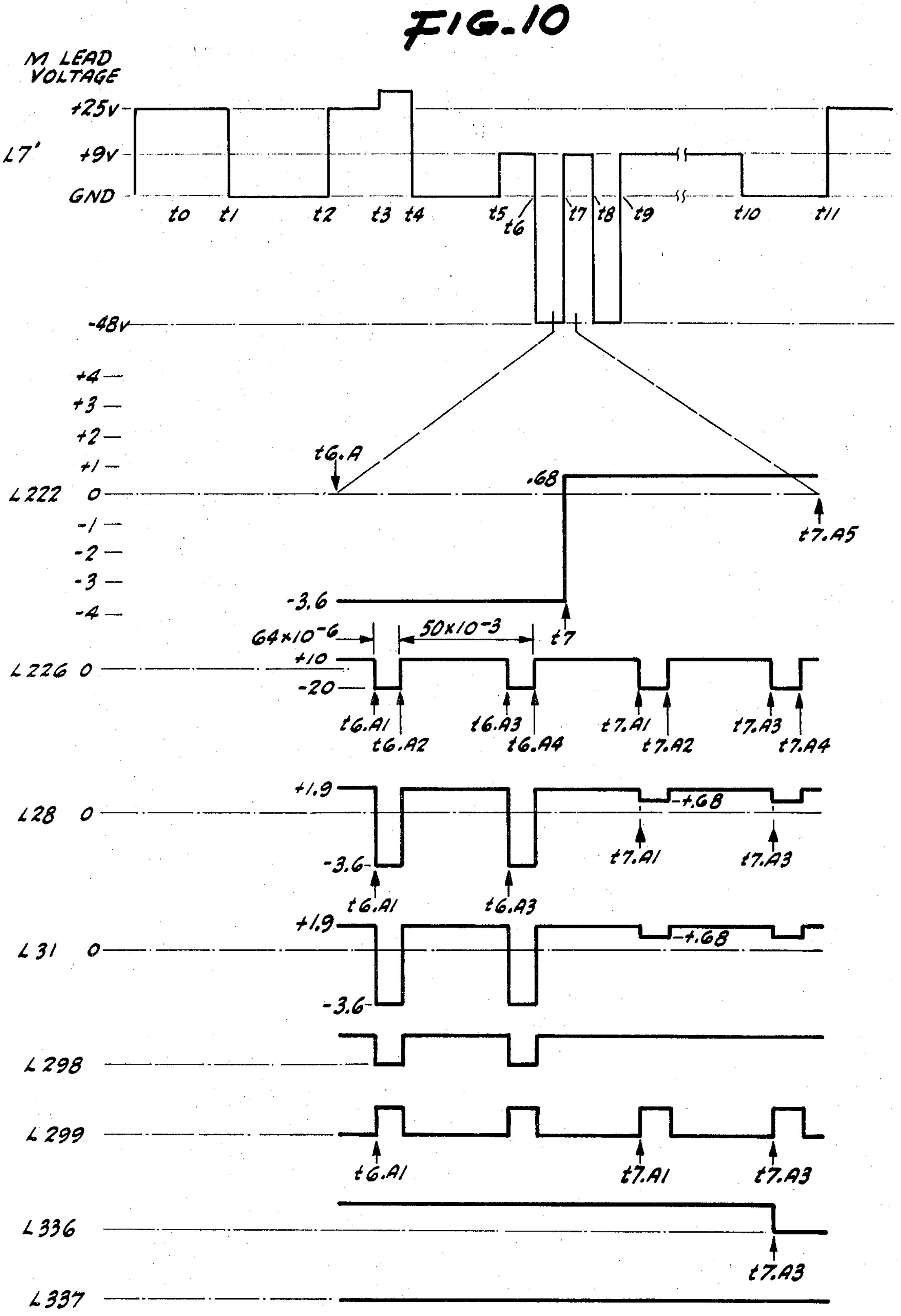
FIG. 10 depicts a schematic representation of waveforms useful in explaining the operation of apparatus of the present invention.

The operation of the system of FIG. 1 is explained with reference to the waveforms of FIG. 10. The M LEAD VOLTAGE waveform represents a typical signal on the metering line 7' in the FIG. 2 circuit. In FIG. 10, the +25 volt level signifies an OPEN condition, the +9 volt level signifies a R GND condition, the GND or zero level signifies a ground condition, and the −48 volts levels signifies a message register score (MRS) condition. The timing scale for FIG. 10 waveform is approximately $250 \times 10^{-3}$ seconds for the period from *t*6 to *t*7.

In describing the operation of the circuitry of FIG. 1, a portion of the time period between *t*6 and *t*8 in the L 7' waveform is shown in expanded scale for the other waveforms of FIG. 10.

The waveform L222 represents the signal of line 222 from a time *t*6.A to a time *t*7.A5. The L222 waveform has an amplitude which does not exceed the ± 4 volts range previously described in connection with the attenuator characteristics of FIG. 9. Note that at *t*6.A the waveform of −48 volts on line 7' is transformed to −3.6 volts on line 222.

Over a period of approximately $160 \times 10^{-3}$ seconds between *t*6.A and *t*7.A5, line 226 in FIG. 4 exhibits four select pulses which swing from a +10 volts to a −20 volts. Specifically, the leading edge of each negative going pulse appears at *t*6.A1, *t*6.A3, *t*7A1 and *t*7A3, respectively. The select pulses in waveform L226 have a period of $50 \times 10^{-3}$ seconds. The pulse width of each pulse, for example the time between *t*6.A1 and *t*6.A2 is approximately $64 \times 10^{-6}$ seconds.

Each of the select pulses of waveforms L226, for the purpose of explanation, has been chosen to be the one out of 16 select pulses which coincide with the closing of the corresponding FET gate 247 of FIG. 5. Accordingly, many other select pulses actually appear in waveform L226 but they are not shown there for the purpose of clarity since they have no operative effect as previously explained.

Waveform L28 represents the signal on line 28 in FIG. 4 as a result of the select pulses of L226 and the analog voltage on L222. The signal of L28 appears substantially the same in waveform L31, since, as previously indicated, the closed FET gate conducts the signal as an input to the A-to-D converter 51.

Waveform L31 represents the sampled analog signal which is converted to a digital signal in the converter 51 of FIG. 5. Detector 51 detects the +1.9 volt level prior to *t*6.A1 produces as outputs from the comparator 260, 261, 262 and 263 - 1111 respectively. Those signals are propagated through the logic circuitry forming the outputs in FIG. 6 on lines 298 and 299 of one, zero respectively. Since the input of +1.9 volts is more positive than each of the other inputs to comparators 261 through 263, each of those comparators have outputs on lines 291 through 293, respectively, which are digital 1's. The input to comparator 260 line 87 of +5.2 volts is more positive than the +1.9 volts on line 31. However, the inputs to comparator 260 are in the reverse order relative to the inputs to the comparators 261 through 263 so that comparator 260 under these conditions also produces an output 1.

After time *t*6.A1, the −3.6 volt signal of L31 is more negative than any of the input signals for comparators 260 through 263. The inverted comparator 260 therefore produces a 1 output while all the others produce 0 outputs.

After time *t*6.A2, the output on lines 290 through 293 again return to all 1's. From time *t*6.A3 until *t*6.A4, the outputs on lines 290 through 293 are again 1000, respectively. After *t*6.A4, those outputs are again all 1's until *t*7.A1. At *t*7.A1, the +0.68 volt input on line 31 produces a 1 output from comparator 260, 0 output from 261 and 1 output from comparators 262 and 263. As previously indicated in the TABLE I, a 1011 condition from the comparators signifies a R GND condition as desired.

From the period *t*7.A2 until *t*7.A3, the output from the converters is again all 1's. For the period *t*7.A3 until *t*.A4, the output from the comparators is again 1011.

For the indications given above the outputs on lines 298 and 299 at *t*6.A1 are 01, respectively. Again at *t*6.A3 the outputs on line 298 and 299 are again 01, respectively. At times *t*7.A1 and *t*7.A3 the outputs on lines 298 and 299 change to 11, respectively.

The digital integrator of FIG. 7 receives the outputs from lines 298 and 299 as transmitted through the transmitter 56 and receiver 55 to the lines 219 and 219' and responsively forms the outputs on lines 336 and 337. The line 336 remains in the one condition until after two 1's have been received on the line 298 as occurs at *t*7.A3. The line 337 remains in the zero condition throughout. Note that in both lines 336 and 337, there is no change until after there has been two like levels on the lines 298 and 299, respectively.

FIXED ADDRESS UNIT TESTING

Referring to FIG. 3, the fixed address unit 50 is one of 64 addressable units which is periodically addressed by the line decoder 30 logic. While FIG. 3 depicts one preferred embodiment depicting one connection of the address unit 50, an alternate embodiment has the output line 320 from unit 50 connected as the 16th input to circuitry 243 of FIG. 5. In this manner, the fixed address unit is addressed by the lines 29 to provide an output on line 28''. Output line 28'', of course, connects through the appropriate one of the FET gates within gate 243 to form an output which connects to the line 31 as an input to the converter 51. With the connection in this alternate manner, the fixed address unit 50 of FIG. 3 is employed to test the converter 51 once per periodic scan of the address specified by the line decoder 30 and the module decoder 32 of FIG. 3. While in FIG. 3 address unit 50 through gate 44 actually tests converter 54, the testing of converter 51 as described is fully analogous.

In FIG. 8, test voltage levels are applied on lines 301 through 316 as previously discussed. Additionally, the pattern of connecting the voltage levels in light of the addressing of the lines 301 through 316 tests the reference signals on lines 84 through 87, tests the comparators 260 through 263 and tests the digital logic circuitry. The predetermined connection pattern of lines 301 through 316 provides a predetermined output signal on lines 298 and 299 in the transmitter 56 of FIG. 6 which is received on lines 219 and 219' of the receiver 55 of FIG. 6.

When the lines 301 through 316 are addressed, for example, serially from 301 to 316, the outputs on lines 298 and 299 are given in the following TABLE II.

TABLE II

| Test Line | Signal Test | Line 298 | Line 299 |
|---|---|---|---|
| 301 | MR min | 0 | 1 |
| 302 | R GND min | 1 | 1 |
| 303 | GND min | 0 | 0 |
| 304 | OPEN min | 1 | 0 |
| 305 | OPEN min | 1 | 0 |
| 306 | GND min | 0 | 0 |
| 307 | R GND min | 1 | 1 |
| 308 | MR min | 0 | 1 |
| 309 | OPEN min | 1 | 0 |
| 310 | GND max | 0 | 0 |
| 311 | R GND max | 1 | 1 |
| 312 | MR min | 0 | 1 |
| 313 | MR min | 0 | 1 |
| 314 | R GND max | 1 | 1 |
| 315 | GND max | 0 | 0 |
| 316 | OPEN min | 1 | 0 |

If the output patterns detected on lines 219 or 219' differ from those indicated in Table II, then an error has occurred. The nature of the error can be determined by analyzing which bit or bits have changed from the established sequence in the addressing, A/D conversion, logic or transmitter-receiver operation.

SAMPLING GATE TEST

Each of the diodes D1 and D2 comprising a sampling gate in FIG. 4 is tested by means of the test signal applied on line 11 and which is derived from the D-to-A converter 9 in FIG. 3. The converter 9, develops three output voltage levels on output line 11. Those voltage levels are +28 volts, ground and −20 volts. These three levels are established, for example, by use of a standard relay circuit which is selectively operated by the signals on the two lines from receiver 55. The relays in converter 9 are connected to the three voltage levels as indicated. When converter 9 places a ground or zero voltage level on line 11, the circuitry of FIG. 4 is in the normal operating mode as previously described. The diodes D1 and D2, the analog sampling gates of FIG. 4, are tested under the four categories: open test for D1, open test for D2, short test for D1, and short test for D2.

The open test for D1 is carried out with the test line at +28 volts. The open test for D1 is carried out in cooperation with the sampling line 226. The test is performed only at the time when the sampling line 226 is selected at −20 volts. With the test line 11 at +28 volts, diode D1 is forward biased and D2 is reverse biased leaving a voltage of approximately +4 volts on line 224 under normal error free conditions. The operation of the circuit is essentially the same as if a large positive voltage were applied on input line 7' in a manner previously described. If an open condition occurs in diode D1, no current is conducted through D1 and hence current from the +28 volt source through resistor RF is connected in parallel through resistor RG to a −20 volt source and through RE to another −20 volt source on line 226. This series parallel combination establishes approximately −4 volt level on line 224 indicating that an error exists since a +4 volts is expected on that line.

The open test for diode D2 is carried out with the signal line 11 at −20 volts. With the input 11 at −20 volts, diode D1 is reverse biased and D2 is conducting thereby establishing a voltage of approximately −4 volts on line 224 under normal error free conditions. If diode D2 is open, however, the voltage source of +20 volts through the resistor RF and through the resistor RG to the −20 volts source established a voltage of approximately +4 volts on line 28 and therefore on line 224 instead of the expected −4 volts thereby indicating an error condition.

The short test of D1 is carried out with test line 11 at −20 volts but is only carried out when the select line 226 is positive at about +10 volts. When line 226 is positive, the output line 224 is normally at approximately +4 volts unless diode D1 is shorted. If diode D1 is shorted, line 223 sinks to a negative level so that the output on line 224 is more negative than −4 volts thereby indicating an error condition.

Finally, the short test of D2 is carried out with test line 11 at +28 volts and when the select line 226 is at +10 volts. Under normal conditions output line 224 will assume +4 volts. However, if diode D2 is shortened, line 224 will rise above +5.2 volts causing fault comparator 260 to produce a "zero" on line 290 thereby indicating an error condition.

In addition to testing the diodes D1 and D2, the sequence of lines 11 and 226 are described above will also detect errors in FET gates 41, 42, 43 and 44 errors in A/D 51, 52, 53, 54 and errors in transmitter 56 and receivers 55.

We claim:

1. In a message metering system for metering the usage of a plurality of subscriber units in a telephone system, the apparatus comprising, metering line means for carrying multi-level signals, one signal for each of a plurality of subscriber units in the telephone system, attenuator means connected to receive said multi-level signals for forming multi-level attenuated signals where said attenuated signals include a plurality of levels representing usage conditions, analog gate means for sampling said attenuated signals to form sampled signals, analog-to-digital converter means for converting said sampled signals to digital representations.

2. The apparatus of claim 1 wherein said analog gate means includes pairs of diodes where the diodes for each of said pairs are connected in series in opposite conduction directions and includes selection means for biasing said pairs of diodes on or off where each pair transmits the voltage level of a sampled signal when biased on.

3. The apparatus of claim 2 wherein said analog gate means further includes a field effect transistor selection gate having multiple inputs connected to receive the sampled signals from said pairs of diodes and operative to selectively provide an input to said converter means.

4. The apparatus of claim 3 further including address decode means for selecting one of said pairs of diodes and for separately selecting an associated one of said multiple inputs whereby a sampled signal is input to said converter whenever said one of said pairs of diodes and said one of said multiple inputs are simultaneously selected.

5. The apparatus of claim 3 wherein said attenuator means includes an input resistor RB connected on one side to receive one of said multi-level signals and connected on the other side in series with a resistor RC which in turn is connected to a sink wherein said analog gate means receives an attenuated input signal from the point between said resistor RB and RC, whereby said input signal is said one of said multi-level signals attenuated by a linear transformation proportional to the ratio of RC to the sum of RC and RB.

6. The apparatus of claim 5 wherein said attenuator means further includes a diode D3 series connected to a resistor RD and together connected in parallel with said resistor RB whereby the voltage transformation of said attenuator means is unchanged when said diode D3 is reverse biased and is proportional to the ratio of RC to the sum of RC and the parallel combination of RD and RB when said diode D3 is forward biased.

7. The apparatus of claim 5 wherein said attenuator further includes a capacitor C1 connected from a point between said resistors RB and RC to ground whereby said capacitor is operative to store the voltage across said resistor RC and is operative to discharge said voltage whenever said analog gate means is in a conduction state whereby the current through said resistor RC is not altered as a function of the conduction state of said analog gate means.

8. The apparatus of claim 5 wherein said attenuator means further includes a current source connected to said metering line means for providing current into said metering line means whenever said metering line means appears as a resistive network thereby providing one of said multi-level signals to said attenuator means.

9. The apparatus of claim 7 including a bias of a first polarity connected to one of said multiple inputs on one side of said analog gate means and a bias of an opposite polarity on the other side of said analog gate means whereby an associated one of said pairs of diodes is cut-off whenever said one of said multiple inputs is open thereby preventing discharge of said capacitor except when said one of said multiple inputs and said associated one of said pairs of diodes are simultaneously selected in the conduction state.

10. The apparatus of claim 5 further including means for selectively establishing said sink at different voltage levels whereby said attenuator means is selected to operate in a normal mode or in a test mode.

11. The apparatus of claim 10 wherein said voltage levels are ground for normal mode, positive for testing said analog gate means in one state, and negative for testing said analog gate means in the opposite state.

12. The apparatus of claim 1 wherein said analog-to-digital converter comprises a plurality of comparators for detecting when the analog levels of said sampled signals exceed predetermined threshold levels and means for forming digital encoded values of the outputs from said comparators.

13. The apparatus of claim 12 further including a transmitter-receiver combination including a light-emitting diode connected to receive an output from said converter.

14. The apparatus of claim 13 further including a digital integrator for digitally integrating said digital encoded values to form reliable indications of said multi-level signals.

15. The apparatus of claim 1 further including a transmitter-receiver combination having a differential circuit for rejecting common mode voltages.

16. The apparatus of claim 15 wherein said differential circuit includes means for transmitting the DC signal level.

17. The apparatus of claim 16 wherein said differential circuit includes a light-emitting diode and a light-sensitive transistor.

18. In a message system for metering the usage of a plurality of subscriber units in a telephone system wherein each of a plurality of subscriber units is associated with a multilevel signal, the apparatus comprising, a plurality of metering lines for carrying the multi-level signals, one signal for each of a plurality of subscriber units in the telephone system, an attenuator for each of said subscriber units coupled to receive a multi-level signal from a corresponding subscriber metering line to form an attenuated multi-level signal, analog gate means, one for each of said attenuators, for sampling corresponding attenuated multi-level signals to form sampled signals, analog-to-digital converter means associated with a plurality of subscriber metering lines, for converting said sampled signals to digital representations, and means for addressing said analog gate means for selecting one gate means at a time as an input to said converter means.

* * * * *